UNITED STATES PATENT OFFICE.

GEO. C. CLOSE AND EDWARD FIELD, OF PORT CHESTER, NEW YORK.

IMPROVEMENT IN SEPARATING TANNIN AND COLORING-MATTER IN QUERCITRON-BARK.

Specification forming part of Letters Patent No. 4,007, dated April 22, 1845.

*To all whom it may concern:*

Be it known that we, GEORGE C. CLOSE and EDWARD FIELD, of Port Chester, in the county of Westchester and State of New York, have invented a new and useful Improvement in Obtaining a Yellow Extract or Precipitate from Quercitron-Bark, which we denominate "Flavine," and which contains all the yellow coloring-matter, or nearly all, that was in the bark from which it was extracted, and also in extracting the astringent portion from the same bark, of which the following is a specification.

Various modes have been adopted in using quercitron-bark for coloring different materials yellow, with more or less success, according to its treatment, since the discovery of its use by Bancroft, and it is now universally used by a decoction or infusion, or in the form of an extract made from the bark itself, with all the vegetable impurities connected with it, and with or without precipitating the tannin by means of gelatine, by which its treatment has been rendered very difficult in practice.

Our method of obtaining the products of quercitron is as follows: After obtaining a decoction or infusion of the quercitron-bark in water by displacement or in any other of the known ways, either with or without the aid of heat, we somewhat concentrate said decoction by evaporation, or we use a concentrated decoction made by pressure in the usual modes, and then let it stand at rest in a suitable reservoir for the coloring-matter to be deposited, the temperature of the liquid being kept up to about 100° (more or less) for some hours, after which the color is allowed to fall, which we ascertain by the clearing of the liquor that has become cloudy during the above process. The color settles to the bottom of said reservoir as a precipitate. We can then draw off the clear liquid and wash and dry the precipitate by exposure to heat or the air. We can then use the liquor drawn from the precipitate and containing all the astringent portions of the bark for tanning hides or skins, for which purpose the bark is in a measure unfitted, in consequence of the coloring-matter contained therein staining the leather and decreasing its value. When the decoction is drawn from the precipitated color it can be used for tanning, as above described, or for other purposes for which similar astringents are employed; or it may be evaporated to an extract similar in character to catechu, and which we denominate "American catechu," it being applicable to similar purposes. The precipitate is found to be the yellow coloring-matter of the bark in a highly-concentrated state and nearly pure, and it answers all the purposes of dyeing yellow, or the compounds of which yellow is a constituent, much better than the crude barks in any of the ways in which it has heretofore been used, and a cheaper and more perfect dye is thus obtained.

Having thus fully described our process, we wish it to be understood that we do not claim extracting the tannin from the coloring-matter in quercitron-bark, as that has before been done by the introduction of gelatine, by which it is separated; but

What we do claim as our invention, and desire to secure by Letters Patent, is—

The process of separating the yellow coloring-matter and tannin or astringent matter of quercitron-bark, substantially as herein described—that is to say, by partially evaporating the decoction and then allowing the coloring-matter to settle, and then drawing off the astringent liquid and preparing it for the uses intended.

GEO. C. CLOSE.
EDWD. FIELD.

Witnesses:
H. A. PECK,
WILLIAM I. ENNIS.